Patented Dec. 8, 1942

2,304,600

UNITED STATES PATENT OFFICE 2,304,600

PRODUCTION OF ADHESIVES

Hans Scheuermann, Ludwigshafen - on - the-Rhine-Oggersheim, Germany, assignor, by mesne assignments, to Plaskon Company, Incorporated, Toledo, Ohio, a corporation of Delaware No Drawing. Application March 14, 1939, Serial No. 261,757. In Germany March 16, 1938

4 Claims. (Cl. 260—29)

The present invention relates to the production of adhesives.

I have found that adhesives on the basis of condensation products of urea or thiourea or both with formaldehyde, which have very good capacity for being applied and which give very good yields are obtained by reacting said condensation products with water-soluble aliphatic amino compounds containing at least two amino groups each bearing at least one free hydrogen atom, i. e. primary or secondary amino groups.

Among amino compounds of the said kind there may be mentioned by way of example primary aliphatic diamines or polyamines, as for example ethylene diamine, diethylene triamine or such amines of higher molecular weight provided they are still sufficiently soluble in water, and also diamines or polyamines which contain other groups, for example ether groups or carboxylic acid amide groups, as for example β.β'-amino diethyl ether or adipic acid di-(ethylene diamide).

For the preparation of the condensation solution it is preferable to use a molecular ratio of urea or thiourea or both to formaldehyde between 1:1.5 and 1:2.5. The most favorable results are obtained by using about 2 molecular proportions of formaldehyde to 1 molecular proportion of urea or thiourea or both.

The procedure for the preparation of the adhesives may be that the condensation solution is prepared acid or alkaline, if desired while heating, and then in a stage of the condensation at which the condensation product present in the solution still has only a limited solubility in water, there is added the aliphatic amino compound in amounts of up to 30 per cent (calculated with reference to the dry content of the solution) at ordinary or elevated temperature. Depending on the temperature and the degree of condensation the solution becomes viscous more or less rapidly. In order to obtain the necessary capacity for being applied, for example for gluing plywood, the necessary amount of water may be added to the adhesive.

There may also be added to the adhesive, water-soluble inert thickening agents, as for example water-soluble cellulose esters or ethers. The usual fillers, as for example wood meal or anhydrous calcium sulphate may also be incorporated with the adhesives.

It is characteristic that the adhesives prepared in the said manner will tolerate an addition of water which the condensation solution alone would not tolerate, without appreciable amounts of condensation product separating. The technical advantage of this behaviour resides in the fact that in spite of diluting the adhesive to the mobility usual and necessary for obtaining the applicability thus rendered possible, the strength of the resulting gluing is equally as good as when starting from a thick adhesive which has been prepared without the addition of amino compound and thus contains considerably more of the condensation product. With this advantage there is connected simultaneously also the further advantage that a smaller amount of the constituents having the binding action proper is sufficient.

The new adhesives are suitable for example both for sticking to paper and also to a great variety of other substrata. Furthermore excellent gluings of plywood can be carried out therewith, either hot or cold.

The following examples will further illustrate how this invention may be carried out in practice, but the invention is not restricted to these examples.

Example 1

A mixture of 100 kilograms of 30 per cent aqueous formaldehyde and 30 kilograms of urea is heated to boiling at a pH value of about 4.5 until a sample diluted at 20° C. with twice the amount of water just begins to show the separation of resin. There are then added to the solution at about 90° C. 13 kilograms of triethylene tetramine, the solution is further heated for about 10 minutes and 150 kilograms of cold water are added in batches during the course of about half an hour while stirring. The adhesive thus obtained may be used for example for gluing plywood. It sets very rapidly so that the good gluing strength obtainable therewith is practically completely obtained after about 2 hours.

Example 2

50 kilograms of 20 per cent aqueous solution of the wood ether obtained by etherifying wood treated with alkali, with monochlor acetic acid or a salt thereof are stirred with 10 kilograms of triethylene tetramine and then 100 kilograms of the cold urea resin solution prepared as described in Example 1 are added. After about 10 minutes, the adhesive is mixed with 100 kilograms of cold water. The adhesive is already ready for use after standing for about 2 hours. It yields for example in the hot press an excellent glued plywood.

What I claim is:

1. A process of producing adhesives which comprises condensing a member of the group consisting of urea and thiourea with formaldehyde until a condensation product has been formed which on diluting with water separates to an appreciable amount from the original solution, adding up to 30% (calculated with reference to the solids content of the solution) of a water-soluble aliphatic amine containing at least 2 amino groups, each bearing at least one hydrogen atom bound to the nitrogen atom, and further reacting this mixture until water-soluble products are obtained having a viscosity which is substantially increased with respect to that of said mixture.

2. The process as defined in claim 1 wherein such further reaction is effected in the presence of a water-soluble, inert thickening agent.

3. The process as defined in claim 1 wherein one molecular proportion of the member of the group consisting of urea and thiourea is reacted with 1.5 to 2.5 molecular proportions of formaldehyde.

4. Aqueous, adhesive solutions prepared according to the method of claim 1.

HANS SCHEUERMANN.